W. F. WARDEN.
FILTER.
APPLICATION FILED JAN. 5, 1914.

1,140,726.

Patented May 25, 1915.

Witnesses
Jas L. Butler
G. L. McClintock

Inventor
Wm. F. Warden,
By
C. E. Humphrey
Attorney

UNITED STATES PATENT OFFICE.

WILLIAM F. WARDEN, OF AKRON, OHIO.

FILTER.

1,140,726.  Specification of Letters Patent.  Patented May 25, 1915.

Application filed January 5, 1914. Serial No. 810,365.

*To all whom it may concern:*

Be it known that I, WILLIAM F. WARDEN, a citizen of the United States, residing at Akron, in the county of Summit and State of Ohio, have invented new and useful Improvements in Filters, of which the following is a specification.

This invention relates to filters for fluids, such as lubricating oils, but the invention is not limited to use in connection with this particular fluid and the word "oil" is used generically throughout the specification and claim to denote any fluid capable of being filtered.

Briefly, the objects of the invention are to provide improved means for filtering the oil in which the filtering media may be removed at will for any purpose without interruption thereof. This object is accomplished by a plurality of filtering media each independently removable and positioned in spaced relation whereby when desired, any one of the media may be removed without interrupting the even flow of oil through the filter or rendering its operation inefficacious.

More specifically, the filtering portion of the device embodies a plurality of hollow cylindrical filtering media of different diameters positioned one within another and preferably arranged concentrically and with the different media spaced from each other and each individually removable and arranged in the path of the flowing oil.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
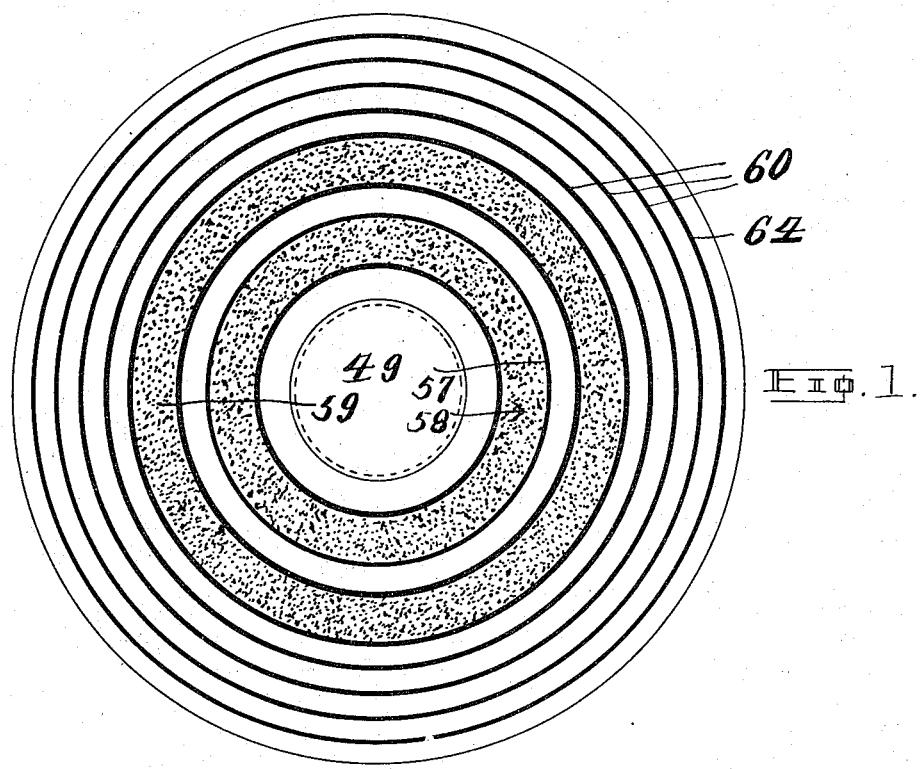
Figure 2:
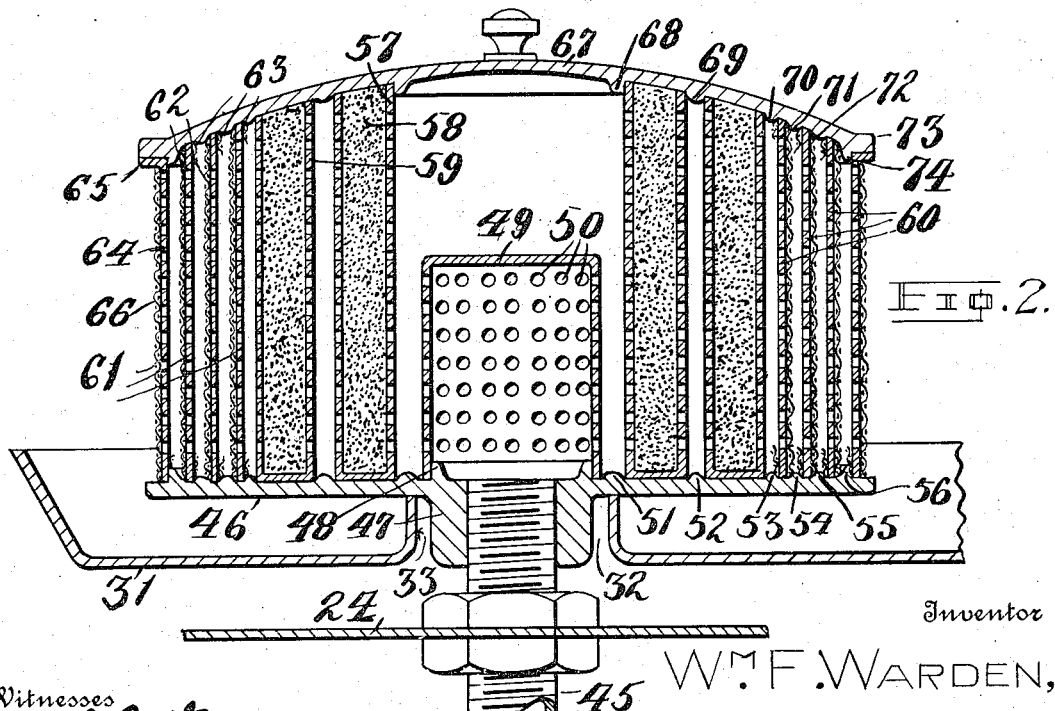

In the drawings in which similar reference numerals indicate like parts in the different figures. Figure 1 is a plan view of the filter portion of the device with the cover removed; and, Fig. 2, is a vertical central sectional view of the device shown in Fig. 2.

Referring to the drawing, 24 designates a portion of the upper wall of a filtering tank, through which passes a pipe 45, arranged above which is a sediment pan 31. Mounted on the upper end of the pipe 45 is a circular plate 46 the central portion of which constitutes an interiorly-threaded hub 47 to receive the threaded upper end of the pipe 45. Extending above the hub 47 is an annular beading 48 with the space around said beading constituting a seat for an inverted cup-shaped screen 49 provided with perforations 50 and usually fitted snugly against the beading 4 to retain it in position. Surrounding the annular beading 48 and in spaced relation therewith to inclose the seat for the lower end of the cup-shaped member 49, is an annular rib 51. The upper face of the plate 46 is further provided with a plurality of concentric ribs 52, 53, 54, 55 and 56 all arranged in spaced relation to each other and with the spaces between co-adjacent ribs constituting seats. Adapted to be mounted upon these seats are a plurality of filtering media. A description of the filtering media preferably employed as shown in the drawings, will follow, but attention is directed to the fact that while the arrangement, construction, number, size, and the spaces intervening between them refer to the drawings, any other arrangement or dimensions may be employed without in any way departing from the scope of this invention.

In the seat between the upturned ribs 51 and 52 is an annular tank 57 provided with perforations in the side walls thereof and filled with some substance such as charcoal or animal bone-black 58. Positioned on the seat between the upturned ribs 52 and 53 is a tank 59 constructed in every way similar to the tank 57, but larger in diameter, mounted on the seats formed between the upturned ribs 53, 54, 55 and 56 are filtering media designated generally by the reference numeral 60 each of which embodies a perforated sleeve or hollow cylinder 61. These cylinders or sleeves are all similarly constructed except that they differ in size and in height for a purpose to be later described. Over each of these hollow cylinders is a filtering cloth or fabric layer 62 with the lower edge thereof extending over the lower edge of its respective cylinder, so that the filtering cloths are thereby held against displacement. The upper side edges of these filtering cloths at 63 are folded or bent over the upper edges of the cylinders 61. Outside of the annular rib 56 is a cylinder 64 identical in every respect to the cylinders 61 except that its upper end is provided with a lateral flange 65 constituting a seat. This cylinder 64 is provided with a filtering cloth 66 similar to the filtering cloth 62 excepting that its upper edges terminate below the rib 65 and is secured by some preferred means.

Mounted on the portion of the filtering media just described is a cover 67 provided with downwardly-extending annular ribs 68, 69, 70, 71 and 72, and each positioned respectively opposite and vertically over the upturned ribs 51, 52, 53, 54 and 55, and the spaces between these downturned ribs constitute seats for receiving the upper ends of the filtering media. The outer edge of the cover is provided with a laterally-projecting portion 73 which rests on the flange 65 of the cylinder 64 and this portion 73 is provided with a downwardly-turned bead 74 which engages the inner face of the cylinder 64 and constitutes means for holding the cover in position and for forming a tight union with the flanged portion 65 of the cylinder 64. It is necessary, as it will be apparent later, to have the cover 67 fit snugly and approximately fluid tight with respect to the upper portions of the filtering media and especially with respect to the flanged portion 65 of the cylinder 64.

I claim:—

A filtering unit comprising a base plate provided with an opening to receive a discharge pipe, the upper face of the plate being provided with an upwardly-projecting flange and with a plurality of upwardly-projecting concentric ribs, an inverted cup-shaped strainer engaging the flange, the spaces between the ribs constituting seats, a plurality of separate filtering media mounted on the seats and each freely and independently removable, and a top plate having its under surface provided with separated concentric ribs, the spaces between which constitute seats to receive the upper ends of the filtering media.

In testimony whereof I have hereunto set my hand in presence of two subscribing witnesses.

WILLIAM F. WARDEN.

Witnesses:
C. E. HUMPHREY,
A. L. McCLINTOCK.